(12) United States Patent
Dohmann et al.

(10) Patent No.: US 10,744,698 B2
(45) Date of Patent: Aug. 18, 2020

(54) PROCESS AND APPARATUS FOR SUPPORTING A PLASTIC PROFILE

(71) Applicant: battenfeld-cincinnati Germany GmbH, Bad Oeyenhausen (DE)

(72) Inventors: Heinrich Dohmann, Hoexter (DE); Joerg Droege, Kerken (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 206 days.

(21) Appl. No.: 15/111,825

(22) PCT Filed: Jan. 15, 2015

(86) PCT No.: PCT/EP2015/050618
§ 371 (c)(1),
(2) Date: Jul. 15, 2016

(87) PCT Pub. No.: WO2015/107093
PCT Pub. Date: Jul. 23, 2015

(65) Prior Publication Data
US 2016/0332353 A1   Nov. 17, 2016

(30) Foreign Application Priority Data
Jan. 15, 2014   (DE) ........................ 10 2014 200 578

(51) Int. Cl.
| | |
|---|---|
| *B29C 47/34* | (2006.01) |
| *B29C 48/90* | (2019.01) |
| *B29C 48/09* | (2019.01) |
| *B29C 48/00* | (2019.01) |
| *B29C 48/25* | (2019.01) |
| *B29C 48/92* | (2019.01) |

(Continued)

(52) U.S. Cl.
CPC ........ *B29C 48/905* (2019.02); *B29C 48/0022* (2019.02); *B29C 48/09* (2019.02); *B29C 48/10* (2019.02); *B29C 48/25* (2019.02); *B29C 48/355* (2019.02); *B29C 48/92* (2019.02); *B29C 48/904* (2019.02); *B29C 48/913* (2019.02); *B29C 48/919* (2019.02); *B29L 2023/22* (2013.01)

(58) Field of Classification Search
CPC .................................................. B29C 48/907
See application file for complete search history.

(56) References Cited

U.S. PATENT DOCUMENTS

| | | | |
|---|---|---|---|
| 4,388,061 A | 6/1983 | Bebok | |
| 2003/0235637 A1* | 12/2003 | Domanico | ............ B29C 33/308 425/403 |
| 2013/0146426 A1 | 6/2013 | Dhond et al. | |

FOREIGN PATENT DOCUMENTS

| | | |
|---|---|---|
| CN | 101947851 A | 1/2011 |
| CN | 203306568 U | 11/2013 |

(Continued)

*Primary Examiner* — Ryan M Ochylski
(74) *Attorney, Agent, or Firm* — Leydig, Voit & Mayer, Ltd.

(57) ABSTRACT

A device, and a corresponding method, for supporting and/or guiding a plastics profile in a calibration station and/or other downstream devices, has at least one support unit in the calibration station and/or in at least one of the downstream devices. The support unit has at least one support element, and the support element is disposed on a beam and can be moved in a parallel manner toward or away from the theoretical central axis, the extrusion axis.

9 Claims, 17 Drawing Sheets

(51) Int. Cl.
   *B29C 48/10*   (2019.01)
   *B29C 48/355*  (2019.01)
   *B29C 48/88*   (2019.01)
   *B29L 23/00*   (2006.01)

(56)  References Cited

FOREIGN PATENT DOCUMENTS

| | | |
   |---|---|---|
   | DE | 20209407 U1 | 7/2003 |
   | EP | 1717012 A2 | 11/2006 |
   | EP | 1967350 A2 | 9/2008 |
   | EP | 2546045 A1 | 1/2013 |
   | JP | 04259527 A | 9/1992 |
   | JP | 11263419 A | 9/1999 |

\* cited by examiner

US 10,744,698 B2

PROCESS AND APPARATUS FOR SUPPORTING A PLASTIC PROFILE

CROSS-REFERENCE TO RELATED APPLICATIONS

This application is a U.S. national stage application under 35 U.S.C. § 371 of International Application No. PCT/EP2015/050618, filed on Jan. 15, 2015, and claims benefit to German Patent Application No. DE 10 2014 200 578.7, filed on Jan. 15, 2014. The International Application was published in German on Jul. 23, 2015, as WO 2015/107093 A1 under PCT Article 21(2).

FIELD

The invention relates to a process as well as an apparatus for supporting and/or guiding a plastic profile within an extrusion line.

BACKGROUND

Similar apparatus are known from prior art. The EP 1 717 012 A2, e.g., presents a support apparatus arranged as a curved shape on a roller, thus allowing for varying support radii.

SUMMARY

An aspect of the invention provides an apparatus for supporting and/or guiding a plastic profile within an extrusion line, in a calibration station and/or at least one further downstream device, the apparatus comprising: the calibration station and/or the further downstream device, wherein the calibration station and/or the further downstream device includes a support unit, wherein the support unit includes a support element, wherein the support element is arranged on a beam and is movable towards, or away from an extrusion axis on an imaginary center axis, wherein the further downstream devices include only a further spray calibration station, an extraction device, a cutting device, or a combination of two or more of these, wherein the beam is connected to a shear-like arrangement, wherein the shear-like arrangement includes a first bar and a second bar, wherein the first bar is connected to the shear-like arrangement by a joint, and wherein the second bar includes a loose connection to the shear-like arrangement through a roller.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 with 3 support units;
FIG. 3 with 3 support units;
FIG. 10 3D representation of an installation with a smaller pipe;
FIG. 11 3D representation of an installation situation with a larger pipe.

DETAILED DESCRIPTION

Figure 1:
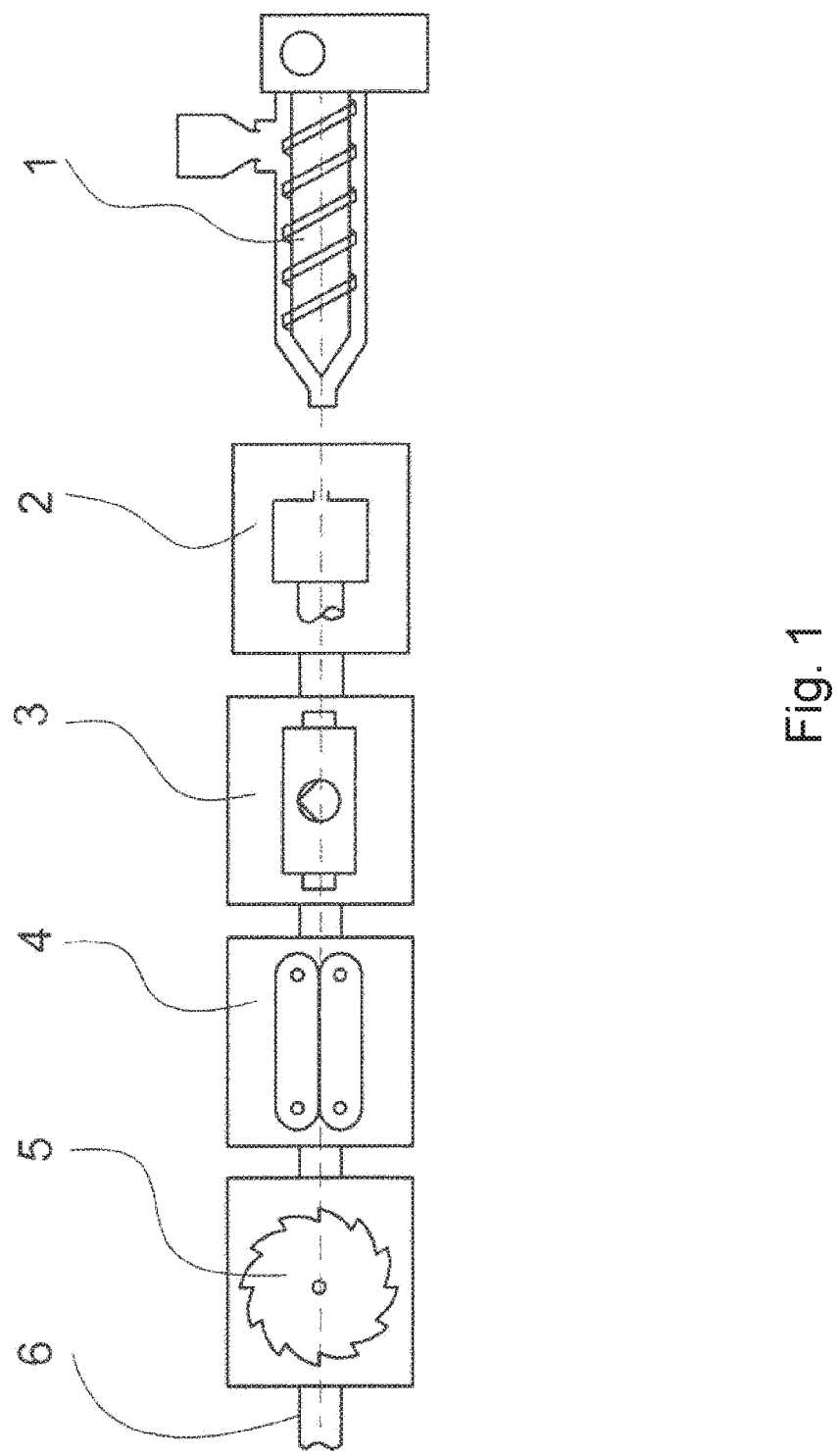
FIG. 1 shows a typical extrusion line.

An aspect of the invention relates to a process as well as an apparatus for supporting and/or guiding a plastic profile, the melt being produced within an extruder, leaving the tool, and being driven along an imaginary center line of extrusion into a calibration station and further downstream devices, one or more support units being arranged within the calibration station and/or some of the downstream devices.

An aspect of the invention is to offer a support apparatus and a process for supporting and guiding extruded plastic pipes that is adaptable to different pipe diameters but at the same time simply built.

The apparatus and process according to an aspect the invention allow for each of the components of the support apparatus to feature at least one contact surface which can be put against the profile to be extruded, the at least two components being arranged so that their contact surface is in contact with the profile to be extruded, thus ensuring that the profile is circumferentially supported.

The entire adjustment procedure, or rather the process of adjusting the outline shaped by this support apparatus, can take place throughout the extrusion process of the plastic melt.

The outline is adjusted through the rotation of threaded rods, which can be done manually or via a central displacement motor. As an alternative, racks, toggle mechanisms, or the like can be used. It is also conceivable that this central adjustment be linked to the entire machine control system and carried out automatically in dependence with measured parameters.

The outline is adjusted by moving elements of the support apparatus towards, or away from, the imaginary center line of extrusion. In pipe extrusion, this could e.g. relate to an increase or a decrease of the outside diameter of the profile. However, a radial movement of the elements towards the center is not inevitable. It is equally conceivable that the adjustments of the outline be realized by shifting the elements along a curved shape or by rotating eccentrical elements.

The support apparatus is composed of separate elements with a support contour, the support contour being adjustable towards or away from the center of the support apparatus. As stated above, the elements of the support apparatus can thus be radially adjusted towards, or away from, the center of the support apparatus.

Thus, in a variant, the elements are panned radially to the center, which can be realized e.g. through the rotation of threaded rods included in the elements, with a radius element featuring the required support contour being attached to the threaded rods, the support contour having contact to the profile.

In an alternative design, the support contour can be panned along a curved shape or a rotation axis. In this case, it is intended to not pan the element with the curve radius and the support contour radially to the center, but along a given curve. Varying slopes and angles of the profile can thus be realized, also allowing for asymmetrical shapes, which is especially practical if the separate elements are not arranged in a circular ring, but offset to one another. However, it is equally conceivable that eccentrical discs be arranged e.g. along a rotation axis vertical to the extrusion line, or that several separate discs pan the support contour to the center of the support apparatus by twisting this rotation axis so as to adjust the intended support area.

If two or more of the separate support elements are arranged next to one another, it is advantageous to install a gear intended to move the elements, which can e.g. be centrally controlled by the machine control system.

The different arrangements or variants are exemplified in several figures, equal elements being numbered equally.

FIG. 1 depicts an extruder line with a conventional extruder 1 and a downstream tool 2, usually in the form of a casing head, advantageously featuring an adjustable mass slit, intended for the production of a pipe 6. A calibration station 3 is arranged downstream. Several downstream devices can be arranged after the calibration station 3, such as further spray calibration stations as well as an extraction device 4, and a cutting device 5, etc.

Figure 2:
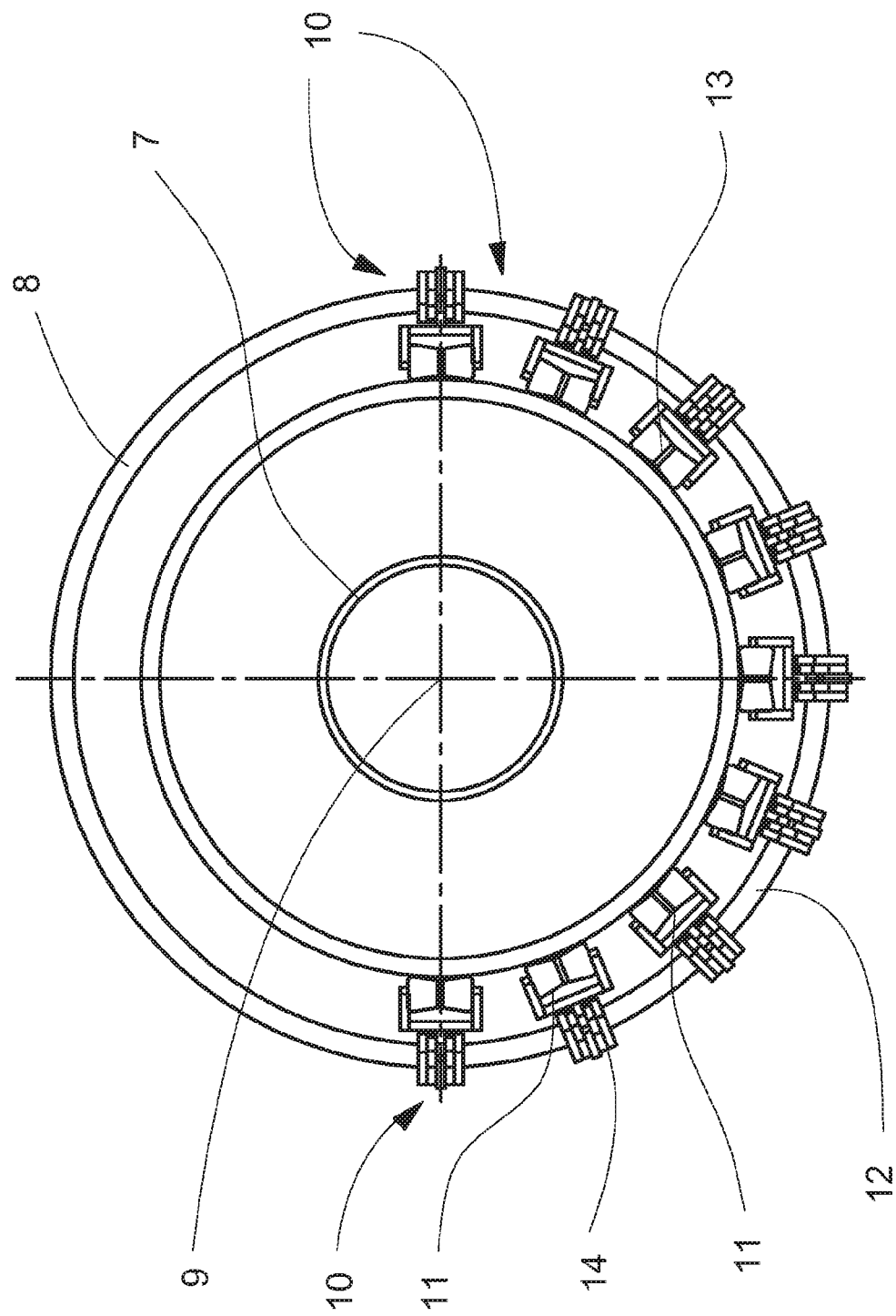
FIG. 2 a section vertical to the extrusion axis and a large pipe.
Figure 3:
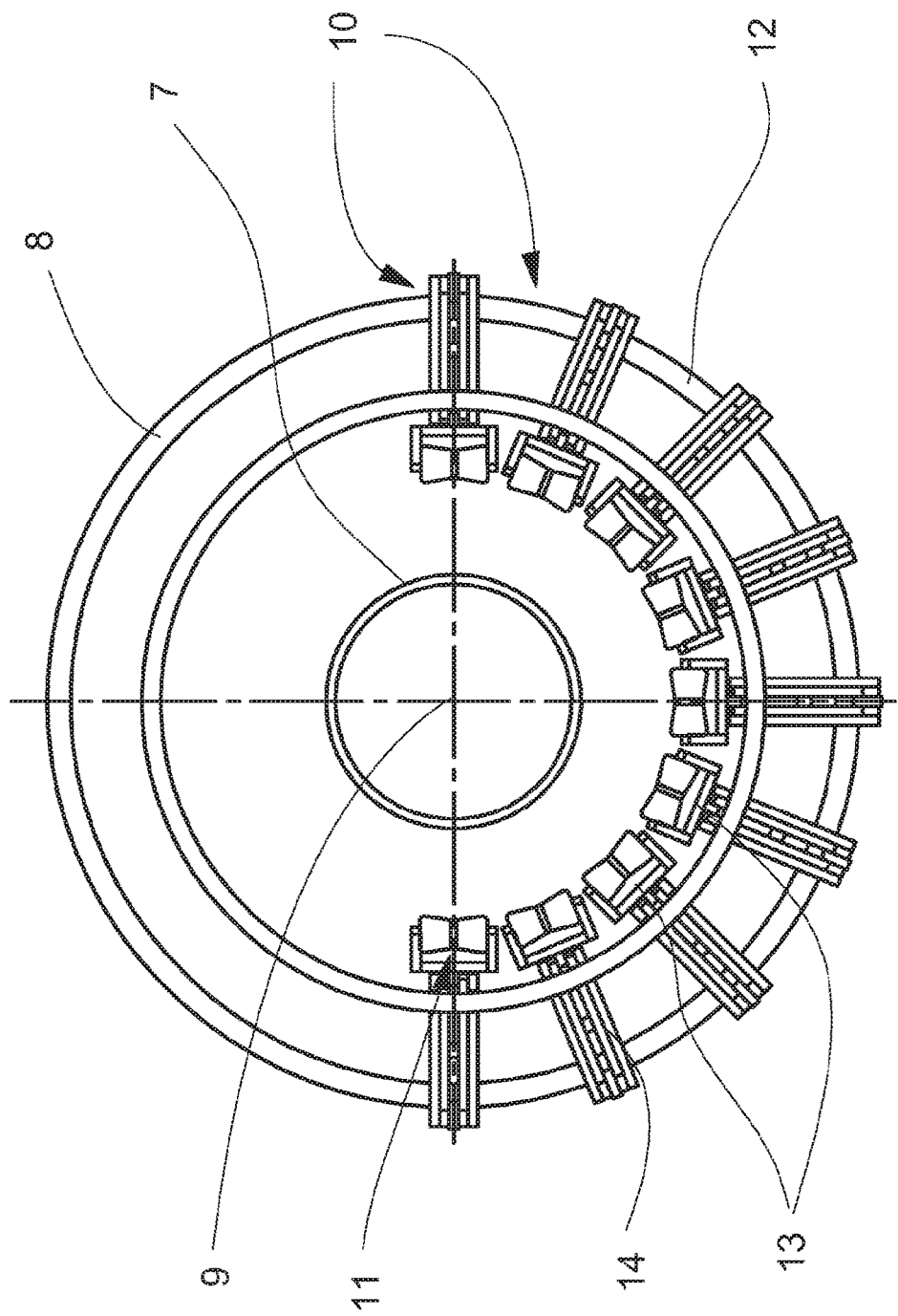
FIG. 3 a section vertical to the extrusion axis and a medium-sized pipe.
Figure 4:
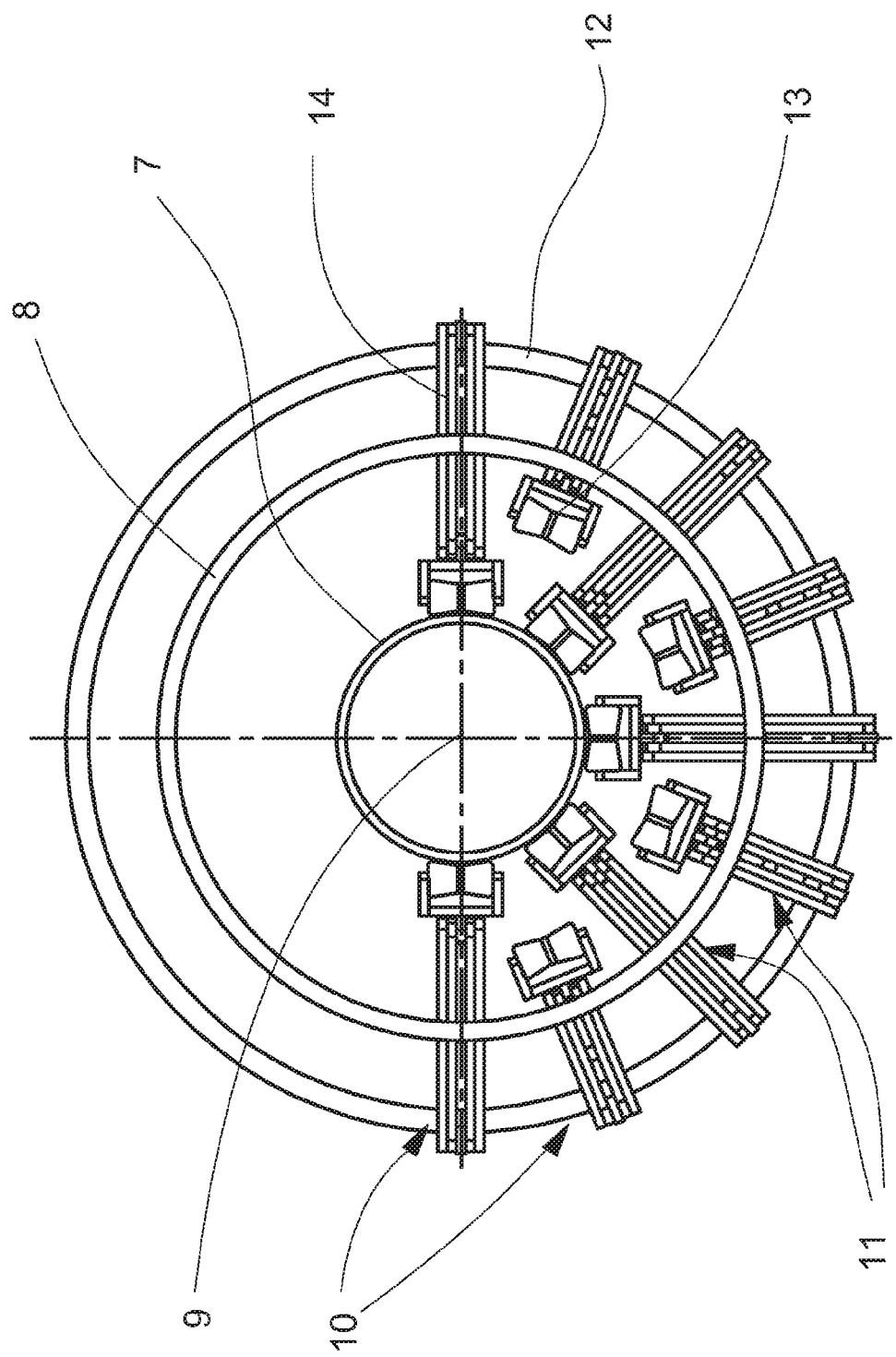
FIG. 4 a section vertical to the extrusion axis and a small pipe.

FIGS. 2 to 4 all present a section vertical to the axis of extrusion 9 through the calibration station 3, or a vacuum station, or a station solely intended for cooling arranged after a station exclusively designed for calibration. The described support units 10 can be provided in both downstream devices and are adaptable to varying pipe diameters. The figures show a small pipe 7 and a large pipe 8 respectively. The entire support unit 10 can be flexibly adjusted to different diameter, which can be done centrally or decentrally, manually or automatically.

The adjustment is made according to a shearing principle 14, support elements 11 being moved radially towards, or away from, the center axis/extrusion axis 9. Depending on the necessary degree of support/guiding of the plastic pipe 6, more or less support elements 11 are applied.

Each of the separate support elements 11 can be linked by a crossbar 12. This link allows for all the applied support units 10 to be moved synchronically.

Within one station (vacuum tank or cooling tank, calibrator) there are usually several support units 10.

It is thus useful to move all the support elements 11 of the applied support units 10 simultaneously.

This can be realized either by controlling or moving the crossbars 12 of each support unit 10 or by linking the separate support elements of each support unit 10, thus moving them jointly.

It is as well possible to apply a smaller number of support elements 11. It is e.g. provided that for small pipes 7, only every second of the support of the support elements 11 arranged around the circumference of the pipe 7 is applied. On the one hand, this can be realized either by controlling the separate linked support elements 11. However, it is equally conceivable that the support elements 11 feature a sort of entraining element, so that the shifting of the cross bar 12 entails a shifting of certain support elements 11, while others remain immobile. Another possibility is to link the support elements 11 by threaded rods, these threaded rods featuring only enough threads for the support elements 11 to be shifted within the intended interval. At a defined point, a lack of further threads ensures a further shifting of the support element 11.

FIG. 2 shows an arrangement of the support elements 11 for a large pipe 8, all of the support elements 11 being applied.

FIG. 3 represents an arrangement of the support elements 11 for a medium-sized pipe which is not depicted.

In FIG. 4, only every second support element 11 is being applied to support/guide a small pipe 7.

All the support elements 11 have the same design and consist i. a. of two rotatable support and guide rollers 13 arranged on a beam 19 that can be moved towards, or away from, the center axis, i.e. the extrusion axis 9, of the pipe. This movement is carried out by a shear-like arrangement 14. Two bars 16 are attached to each of the joints (15 and 17). Joint A 15 is connected with the beam 19 and joint B 17 with a bracket 18.

When the bars 16 that are attached to joint B 17 are being shifted in the direction of movement of the bracket 18, the beam 19 moves parallelly towards, or away from, the bracket 18. The pairs of bars are linked by joint C 20 to build a shear-like arrangement 14. The pair of bars attached to joint A 15 features at its end a floating bearing in the form of a roller 21 which enables this part of the said shear-like arrangement to slide along the downside of the beam 19.

The bracket 18 can be fixed to the walls of the respective station, if one of the pairs of bars 16 is fixed and the other one attached loosely to the bracket 18. It is, however, equally conceivable that the bracket 18 itself be designed as a threaded bar, thus moving one of the pairs of bars 16. The bracket 18 would then function as the shifting element 21.

For the functioning of the apparatus it is not specified which side of the pairs of bars 16 is designed as a fixed or floating bearing; what is important is that the whole arrangement 14 can open and close around joint C 20 like a pair of shears. It is thus also conceivable, as said above, to fix one of the pairs of bars 16 to the shifting element 21, which can be done by means of a thread, a pin, or any other form of entraining element, and to attach rollers to the other end of the pair of bars 16 so as for this end of the bars to be able to roll along the bottom of the station (e.g. the inside of the cooling tank). A form of slide bearing is also possible.

Ideally, the shifting elements 21 used to adjust the support elements 11 should be installed outside the stations so as for the control units not to have to be sealed against spray water within the stations. Also, this arrangement facilitates maintenance work.

Figure 5:
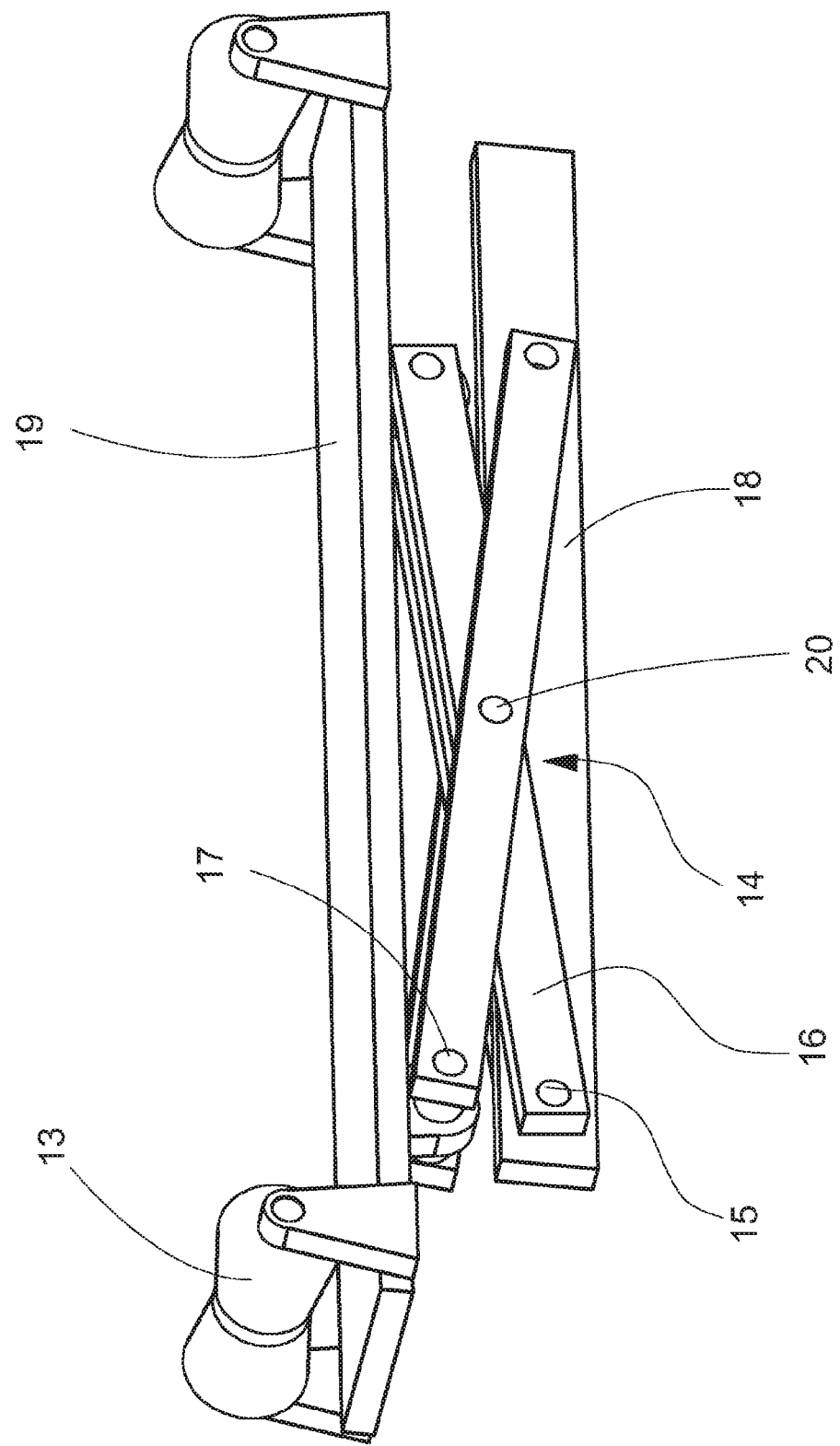
FIG. 5 a support unit retracted.

FIG. 5 depicts a support element 11 with two support and guide rollers 13 that are arranged on a beam 19. The beam is connected to two bars 16 that are linked by joint C 20 to build a shear-like arrangement 14. One bar 16 is connected by joint 15 with a bracket 18 and the other bar 16 is attached to the beam 19 by joint 17. The shear 14 is completely retracted.

Figure 6:
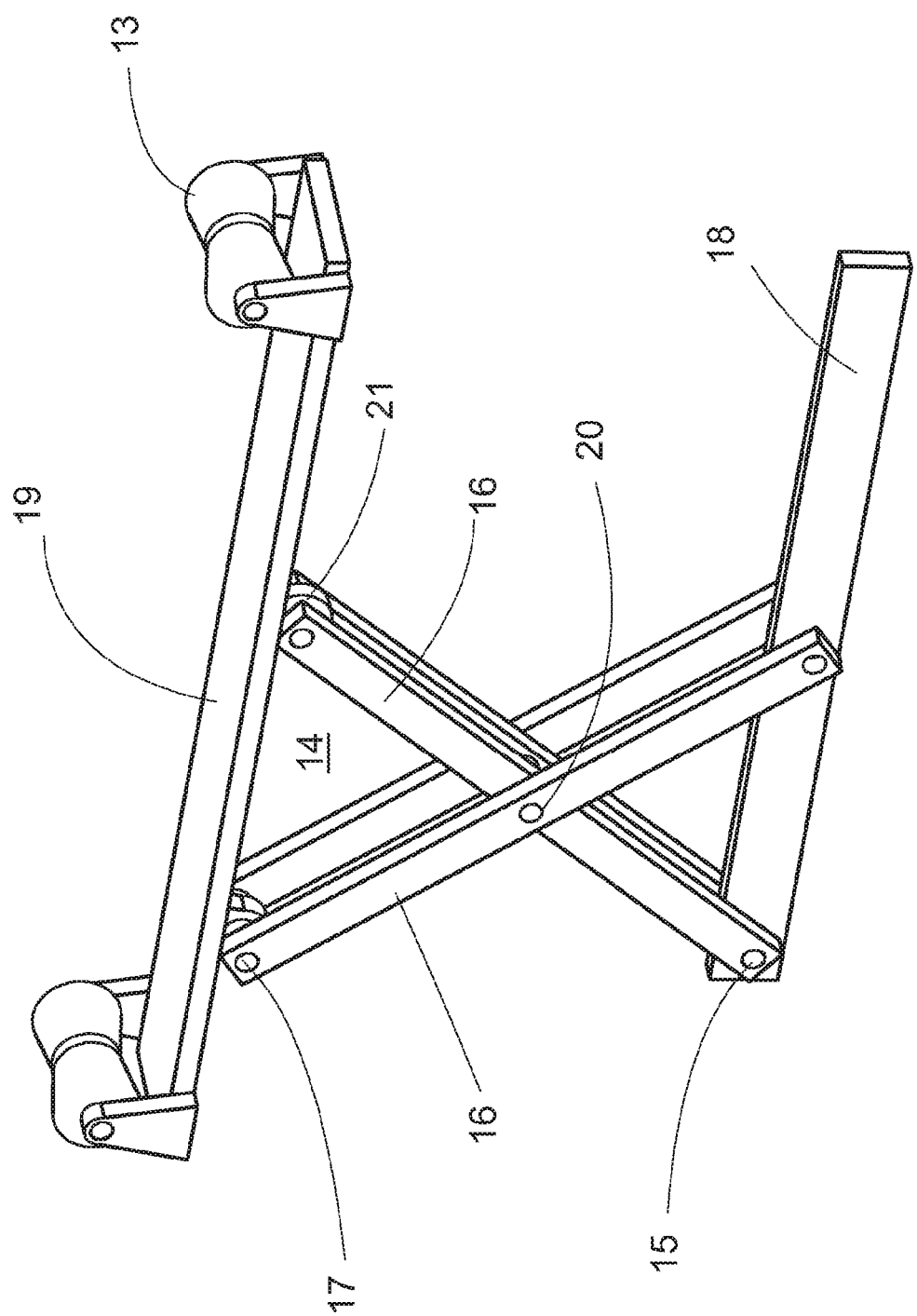
FIG. 6 a support extended.

FIG. 6 shows the support element of FIG. 5 in extended position, equal elements again numbered equally.

Figure 7:
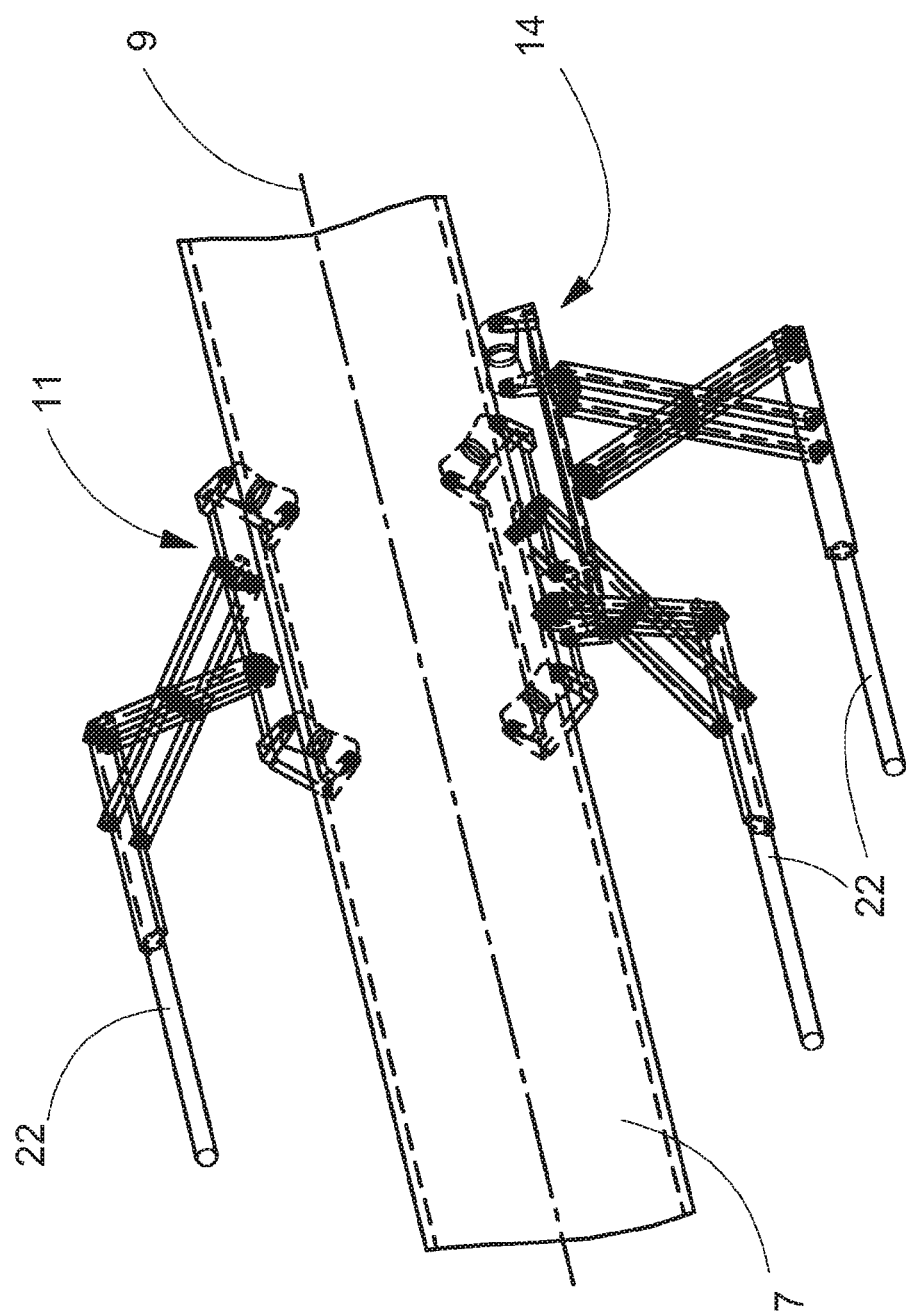
FIG. 7 representation in perspective of support units at a small pipe.

FIG. 7 shows several support units 10 distributed around the circumference. The units are completely retracted. The support elements are adjustable individually or jointly. The adjustment is realized manually or by a motor with push rods or spindles that are installed on the downside of the guide elements.

On the left side, two bars are attached to the lower push rod by a joint. On the right side, two more bars are fixed to the external geometry, e.g. the vacuum tank (fixed/floating bearing). In the center, all four bars are connected by another joint. Below the upper plate on the right side there is a roller that can roll along the downside of the element. On the right side, the two bars are fixed via a joint with the upper part. Again, the result is a fixed/floating bearing. Thus, when the lower shifting element is being moved to the right, the construction is erected. One or more sliding elements are arranged on the upper carriage. The pipe is being pushed against these sliding elements, thus being guided.

The adjustment is realized with bars and spindles going through the vacuum tank to the outside.

Length and width of the carriage are variable, as is the necessary adjustment track of the pull rods. The bearing of the rollers or sliding elements is ascertained by a carriage and can be realized by means of slide bearings or roller bearings.

The lifting element can be directly welded to the tank or else attached to it via an intermediate element, e.g. a bearing block or a similar item.

Figure 8:
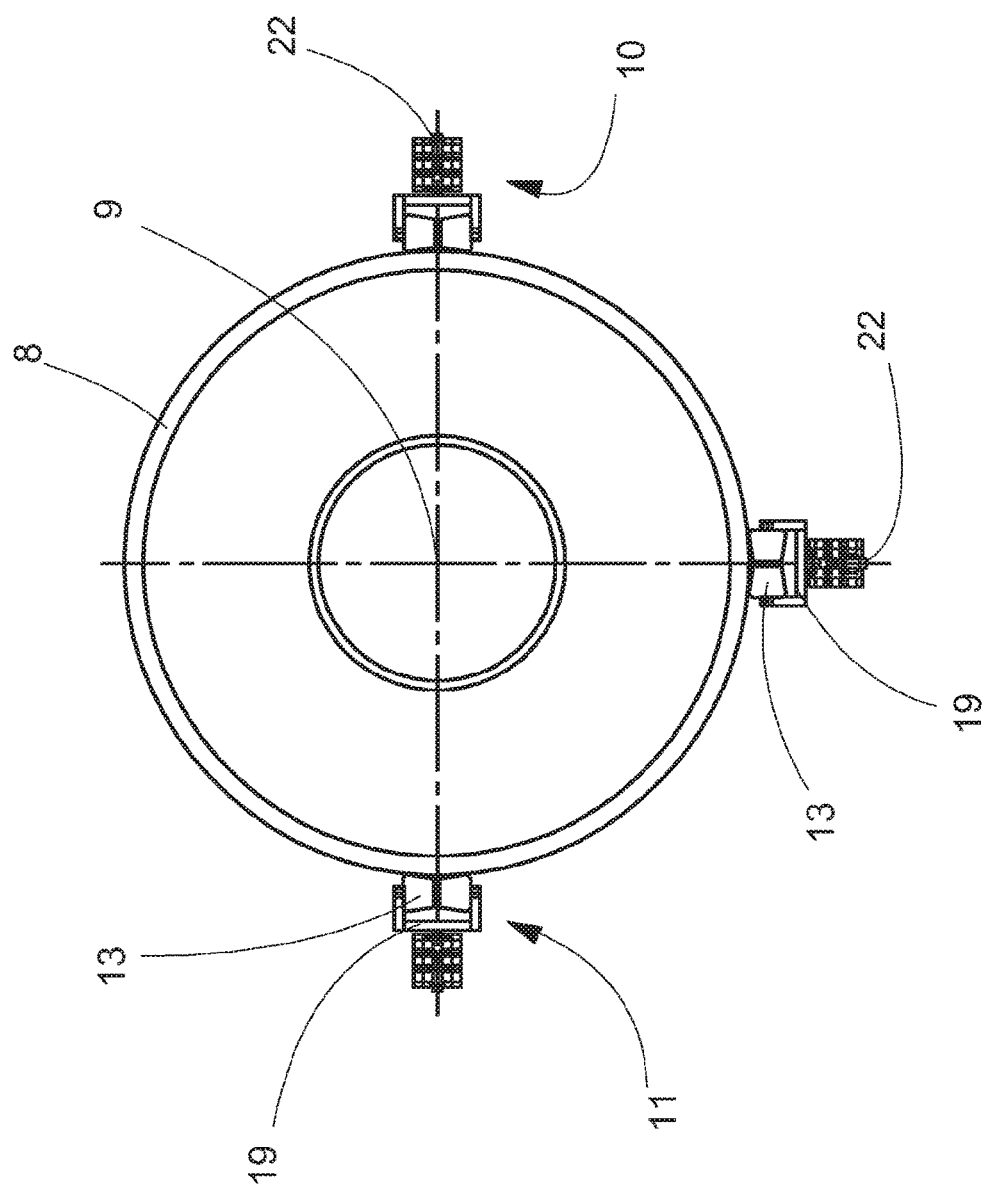
FIG. 8 cf.

FIG. 8 shows another design analogue to the arrangement in FIG. 2, with a representation of only three support elements 11. Additionally, the shifting element 22 is represented.

Figure 9:
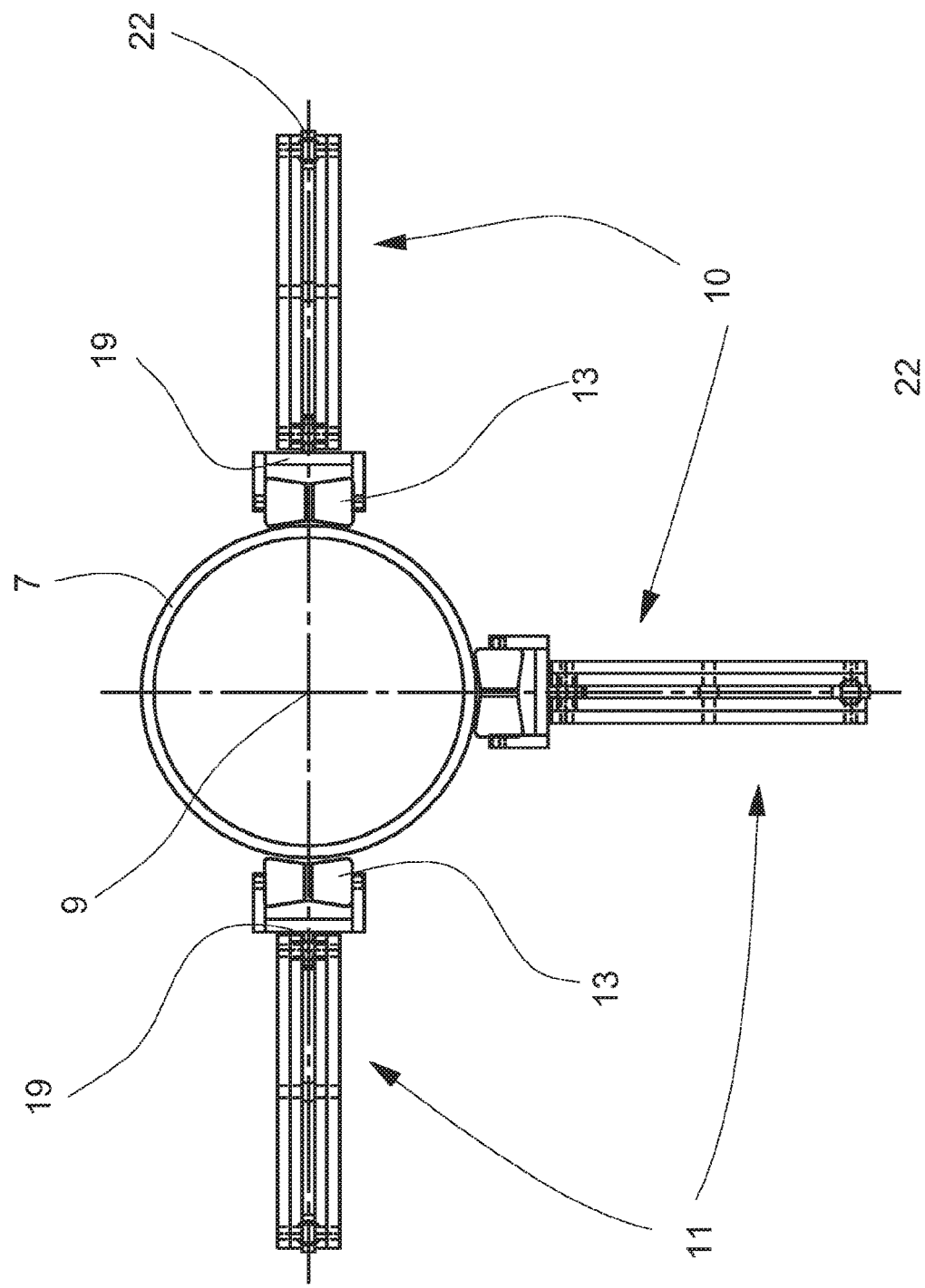
FIG. 9 cf.

FIG. 9 largely equals FIG. 8, the represented arrangement being adapted to a smaller pipe, thus corresponding to the arrangement in FIG. 4.

Figure 10:
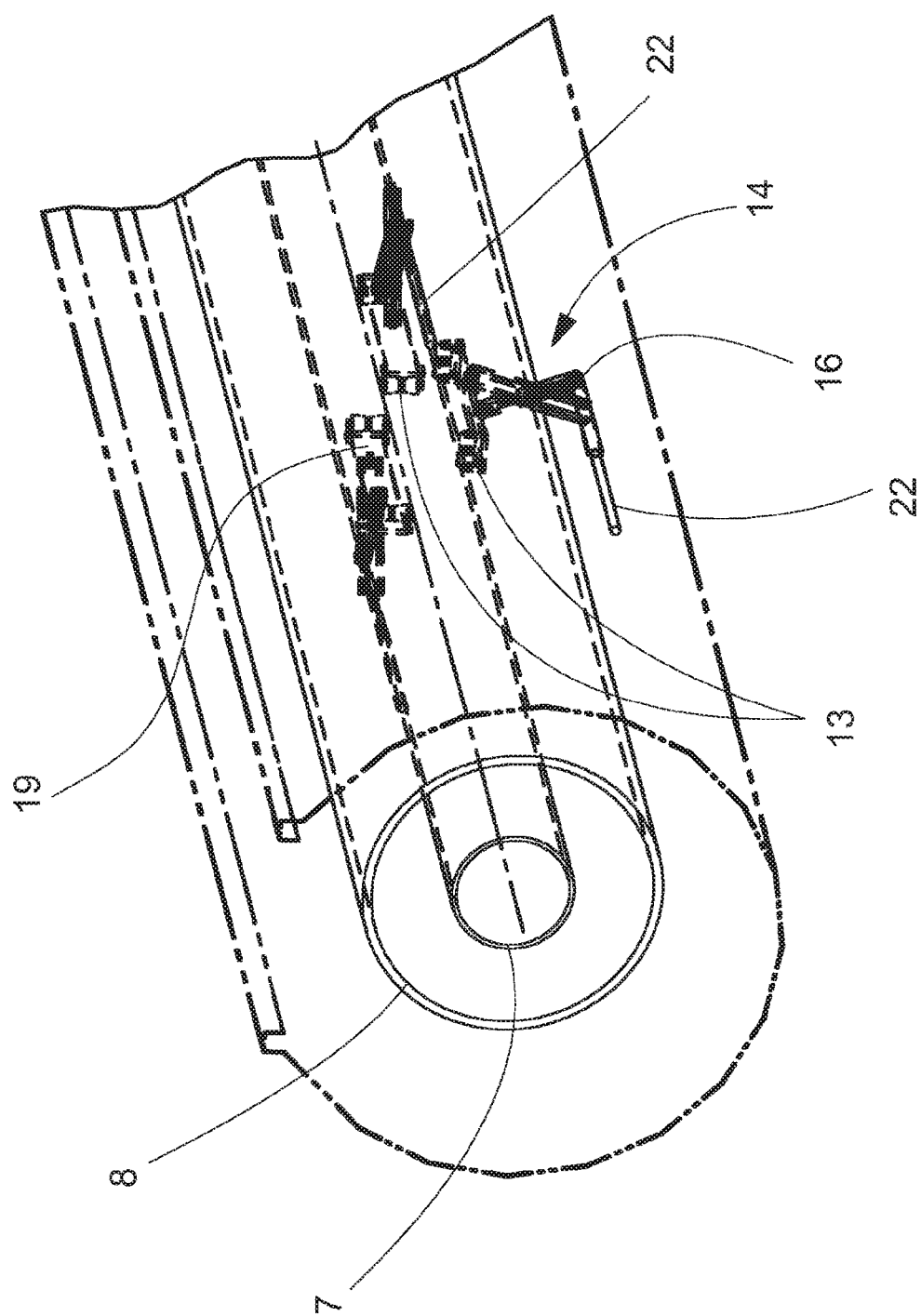
Figure 11:
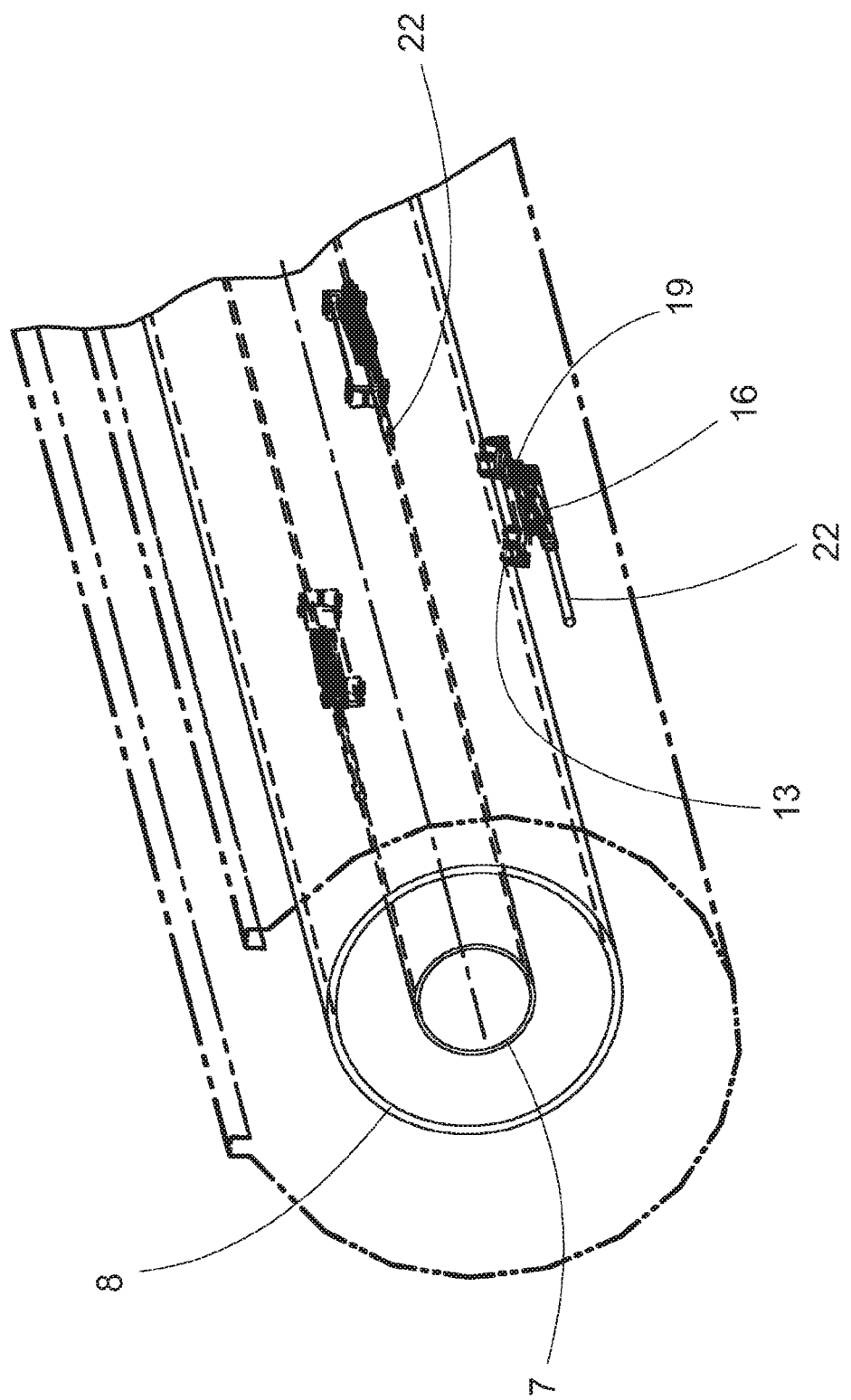

FIGS. 10 and 11 show a 3D representation of the invention, FIG. 10 depicting die arrangement for a smaller pipe 7 and FIG. 11 the arrangement for a larger pipe 8.

Figure 12:
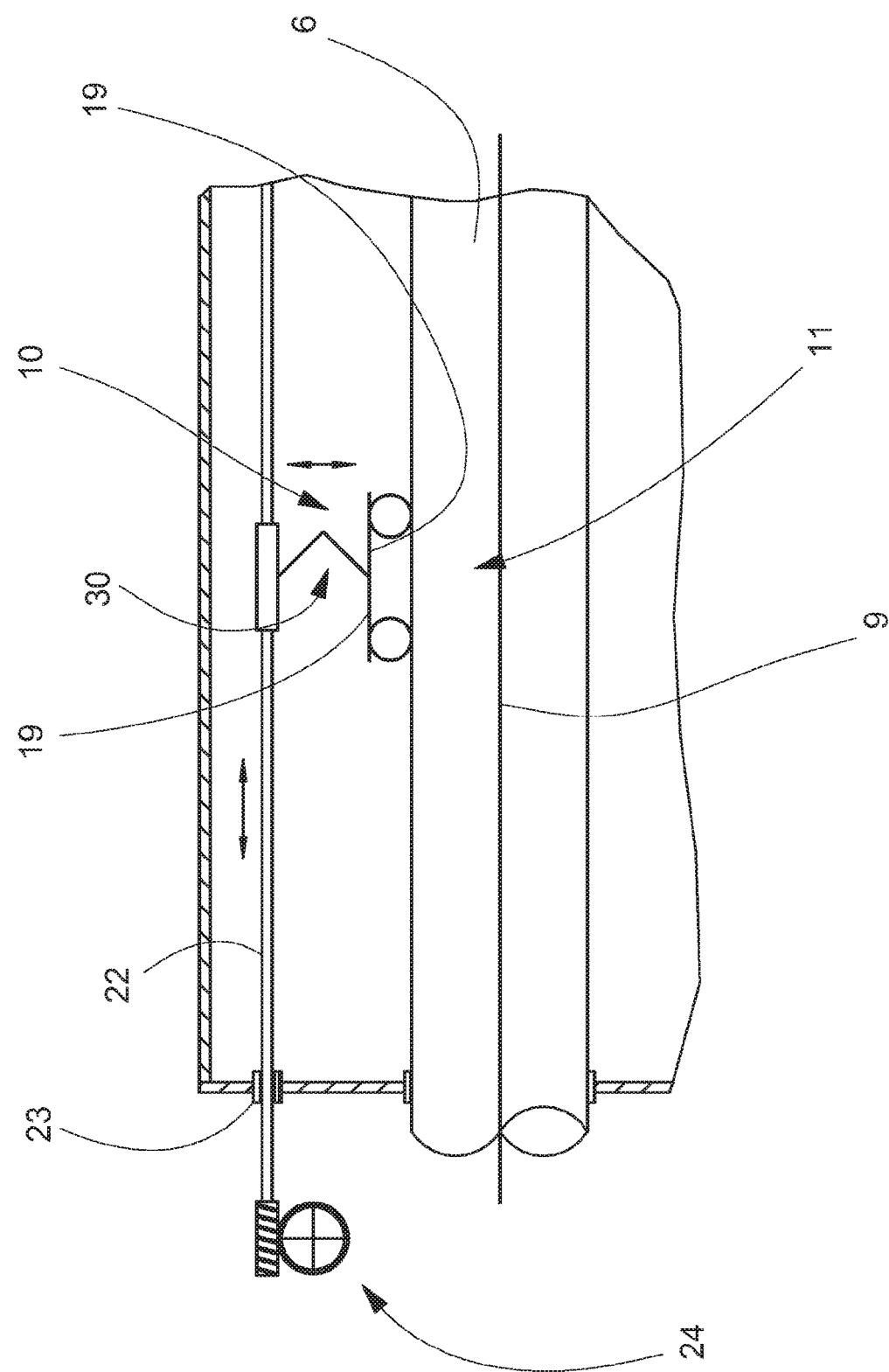
FIG. 12 variant for central adjustment.

FIG. 12 schematically shows in a half-section the possibility of central controlling of the support units 10. One support element 11 of the support unit 10 is in contact with the outer surface of the pipe 6. This design can feature every variant of a support unit 11 described here (support and guide roller 13, water film 27, belt 26 et al.). The support unit 10 is moved towards, or away from, the extrusion axis 9 along the shape, the support unit 10 being connected to a shifting element 22. The shifting element 22 can be made of plastic or aluminum, a corrosion-resistant material that can be used without lubricants representing the more advantageous choice. The great advantage of this design is that all drive elements 24 are placed outside the tank (whether this be a vacuum or cooling tank, a calibration station, or a combination of these). The driving element can be a threaded connector attached to the shifting element 22 and featuring a gearwheel or a similar element. However, every other form of drive that allows for an axial shifting of the shifting elements 22 is equally conceivable. A seal 23 ensures the sealing shifting element 22, which has a smooth surface, between the inside and the outside of the tank. The two double arrows symbolize the axial movement of the shifting element 22, or the parallel shifting of the beam 19 with the support element 11 respectively.

It obviously remains possible to adjust elements centrally, even if FIG. 12 only shows a single support unit 10 on one side of the pipe 6.

Figure 13:
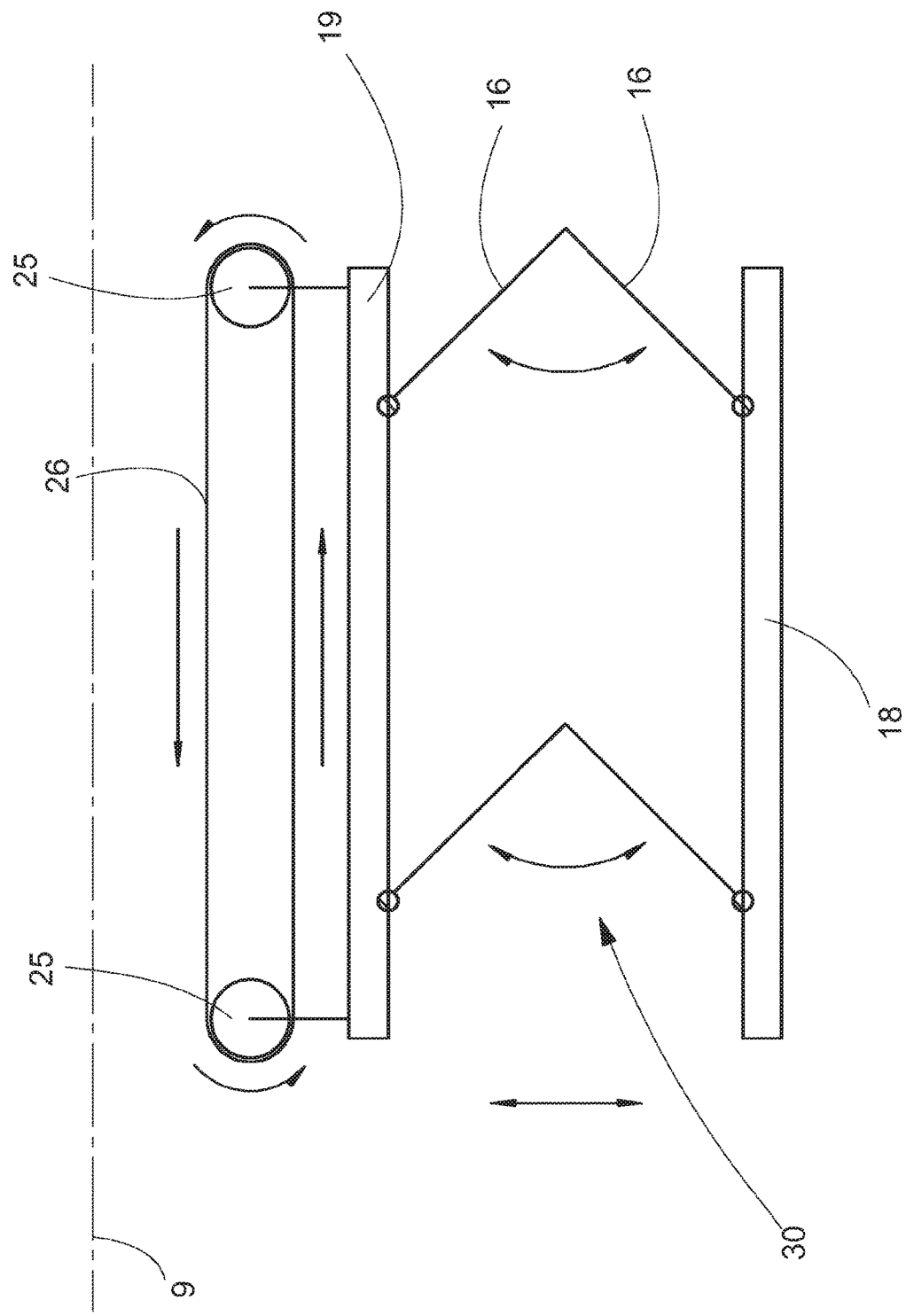
FIG. 13 variant of the support unit.

Another design of the support unit 10 is schematically represented in FIG. 13. Bars 16 connected with the beam 19 by a joint are attached to the bracket 18. A change of the angle between the pair of bars that is connected by another joint leads to the movement of the beam 19 towards, or away from, the extrusion axis 9, the movement being represented by the double arrow. This design features a roller pair 25 installed at the beam 19 and with a belt 26 stretched over it. The belt 26 can move over the rollers in extrusion direction along with the pipe 6, thus guiding it. Depending on the design of the belt 26, the contact surface with the pipe 6 can be larger or smaller. If, for instance, an elevation is provided in the middle of the belt, the surface contact becomes a linear contact.

Figure 14:
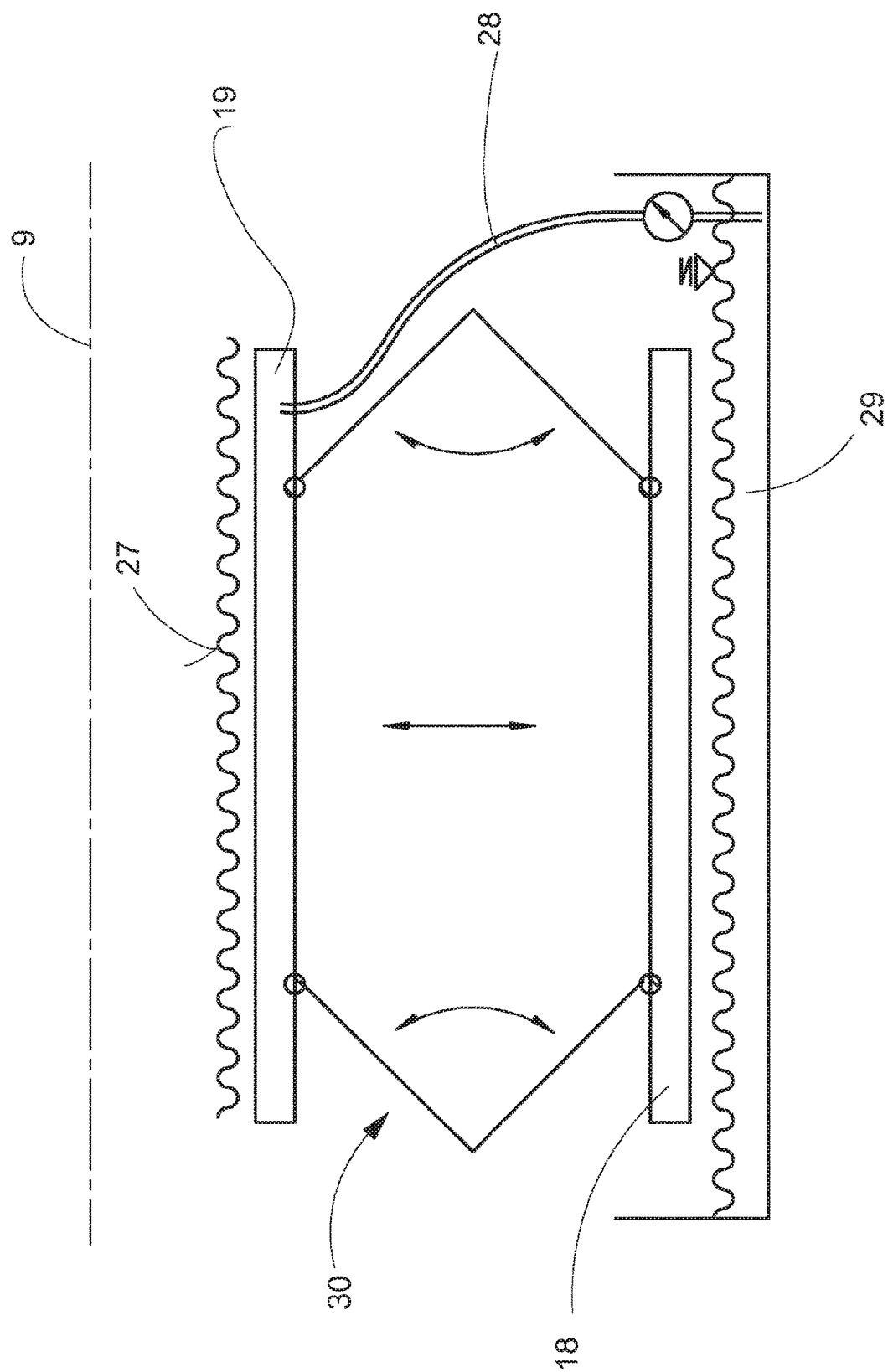
FIG. 14 further variant of the support unit.

FIG. 14 shows a further alternative. It shows again, as does FIG. 13, bars 16 attached to the bracket 18 and connected with the beam 19 by a joint. In this case, however, one of the pairs of bars is installed at an angle of 180° to show that even with varying shapes 30 the shifting of the support unit 10 towards, or away from, the extrusion axis 9 is possible. A change of the angle between the pairs of bars thus entails a shifting of the beam 19. A film of water 27 is established on the beam 19, the pipe 6, which is not depicted here, swimming, or sliding, on the film of water. An exemplary way to ensure the water supply to keep the film of water 27 intact is also represented by a conduit system 28 for the cooling water from the bottom of the tank, from where water is pumped up to the beam constantly or only if needed.

In all of the represented variants, the bracket 18 can be replaced by the wall of the tank or the bracket 18 can be attached to the wall. A displacement of the bracket 18 is therefore not obligatory; the shifting element 22 can work directly at the shape. Furthermore it is conceivable in all design variants that the support units 10 be arranged around the pipe in such a way that they do not all have the same distance to the extrusion axis, are deliberately placed at different distances. This makes it possible to support and guide even a pipe with an individual design, e.g. an oval pipe.

Figure 15:
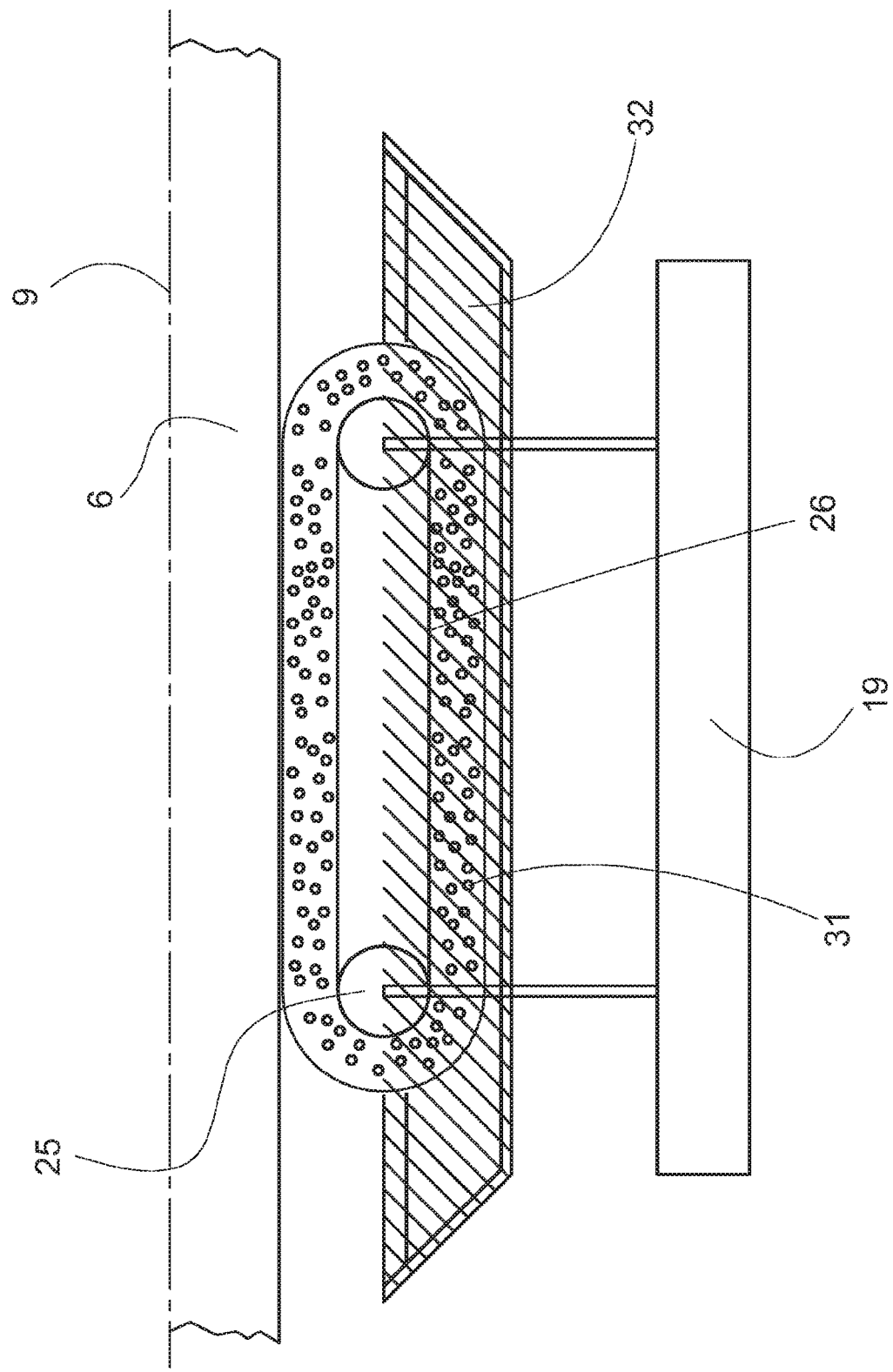
FIG. 15 representation of an installation situation with a pipe.

FIG. 15 depicts a sort of combination of the two variants according to FIGS. 13 and 14. Installed on the belt 26 is a sort of sponge 31, the design, however, allowing as well for a different absorbent material. This sponge 31 makes it possible to support and/or to guide the pipe 6 without leaving imprints. Moreover, the sponge 31 can absorb water, thus increasing flexibility and sliding facilities along the pipe surface. As the belt with the sponge is being rotated by the rollers 25, it can absorb water on the side that is averted from the pipe while being driven through a water bath 32. The installation on the beam 19 allows also for this design to be shifted along the shape, which is not depicted here, parallelly to the axis of extrusion 9.

Figure 16:
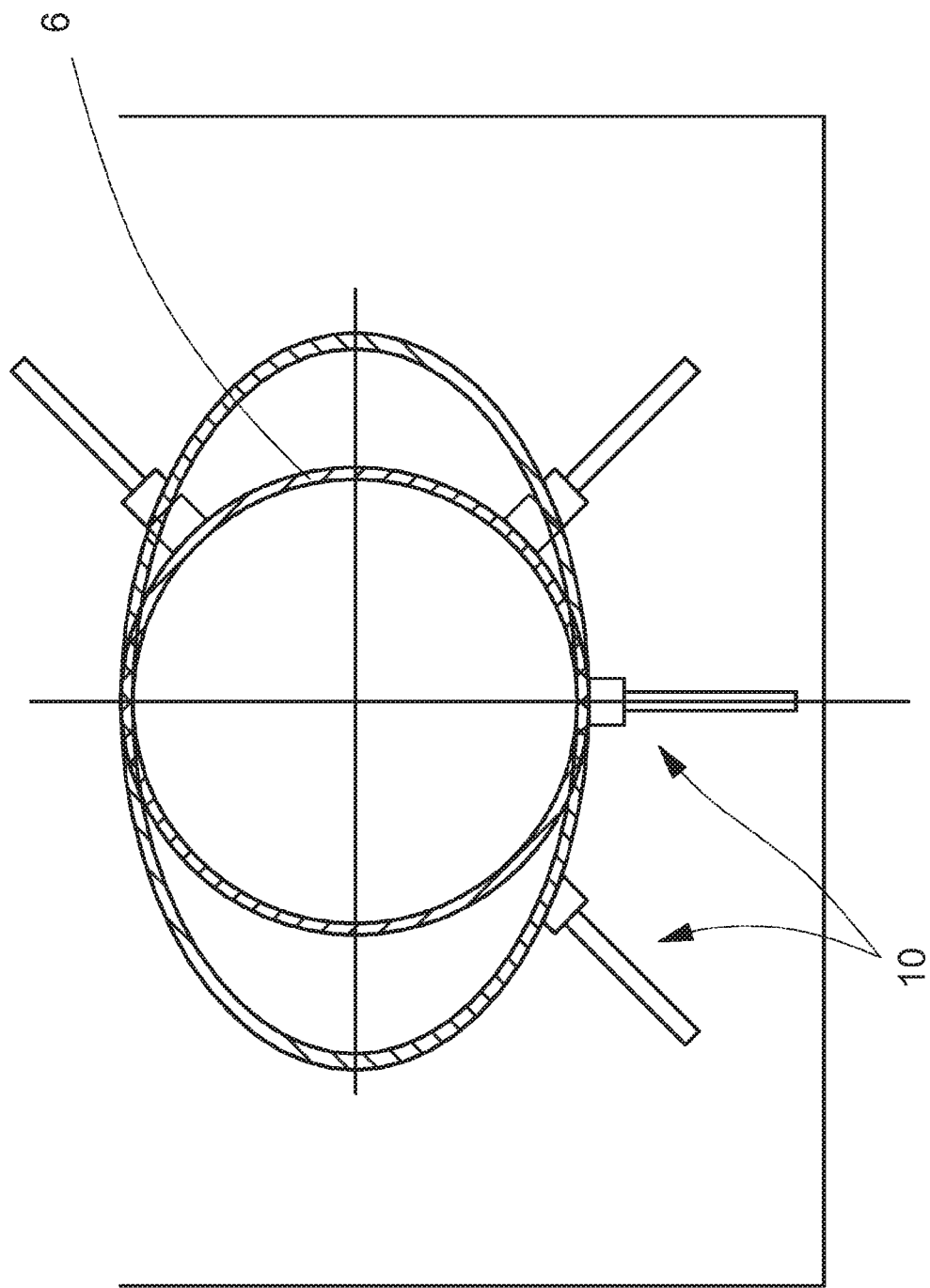
FIG. 16 cross-sectional view of a pipe with support units.

FIG. 16 shows again what has been said above about influencing the roundness of the pipe. Depending on how much the support unit 10 is being shifted towards the extrusion axis, a round pipe can be supported as well as an oval pipe. Depending on production conditions, this flexibility of adjustment makes it possible if necessary to deliberately support a desired circular pipe ovally, the conditions within the extrusion line then shaping it into a circular pipe. By means of suitable procedures, the roundness of the pipe can be measured at the end of the extrusion line, allowing for adjustments to be made in cases of deviations via the control unit and a measuring and control circuit. In this way, the quality of the pipes can be influenced during production.

Figure 17:
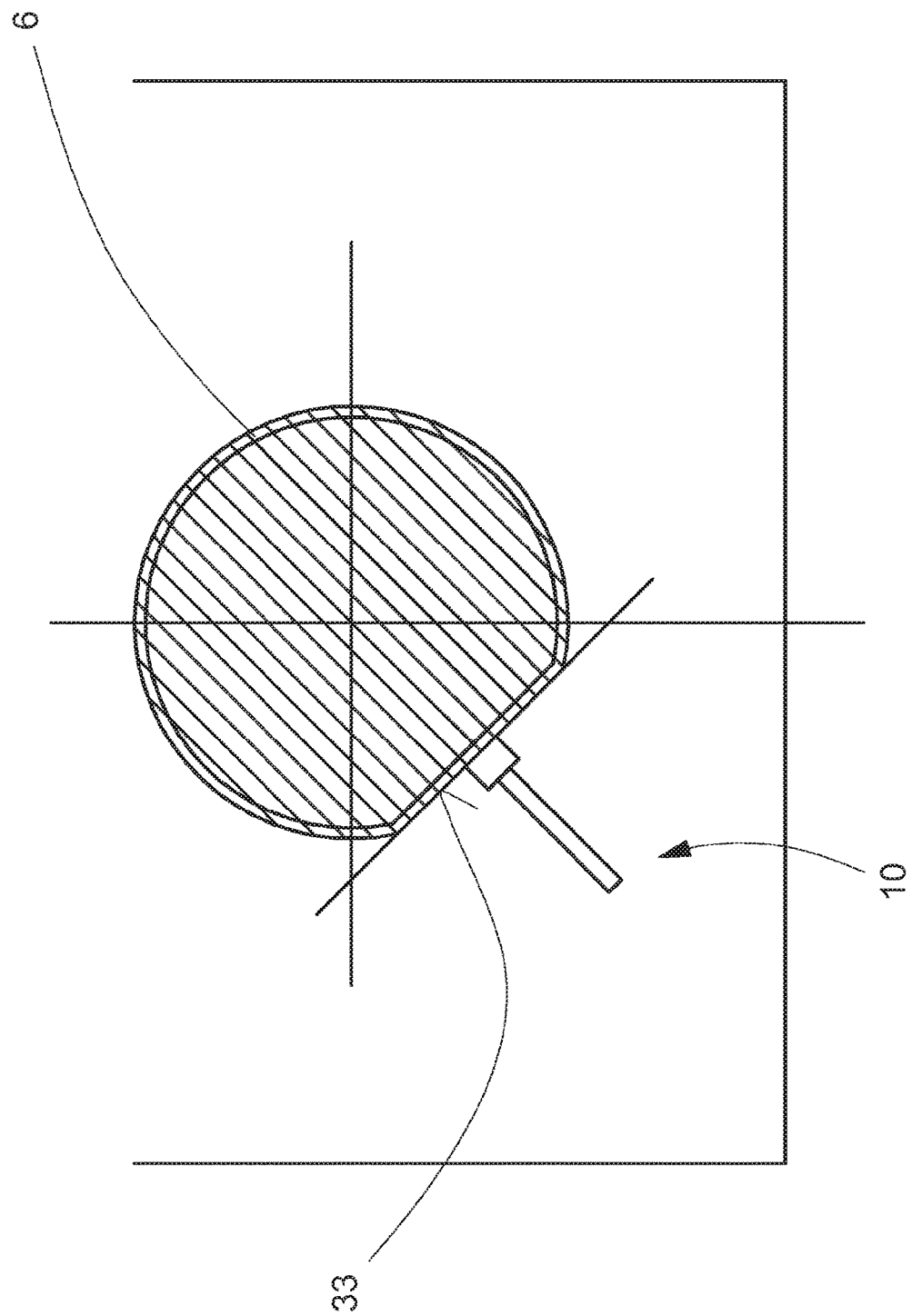
FIG. 17 cross-sectional view of a pipe with a support unit and flat plate.

With the apparatus according to the invention and the process, so-called flats can be avoided, because all the components in contact with the pipe are soft and elastic. Flat 33 denotes a representative flat in the pipe caused by a support element, schematized in the section in FIG. 17 as a straight line similar to a tangent.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

ENNUMERATION LEGEND

1. Extruder
2. Tool
3. Calibration station
4. Extraction device
5. Cutting device
6. Pipe
7. Small pipe
8. Large Pipe
9. Extrusion axis
10. Support unit
11. Support element of 10
12. Crossbar for 11
13. Support and guide roller
14. Shear-like arrangement
15. Joint A
16. Bar
17. Joint B
18. Bracket
19. Beam
20. Joint C
21. Roller
22. Shifting element
23. Seal
24. Drive
25. Roller
26. Belt
27. Water film
28. Connector
29. Cooling water
30. Shape
31. Sponge
32. Water bath
33. Flat

The invention claimed is:

1. An apparatus for supporting and/or guiding a plastic profile within an extrusion line having an extrusion axis, the apparatus comprising:
a plurality of support units, each support unit of the plurality of support units including a support element, each support element comprising a beam and being movable towards and away from the extrusion axis,
wherein, when viewed along the extrusion axis, the plurality of support units are arranged along at least a part of a circumference of the extrusion axis, and
wherein each beam of each support element is connected to a shear-like arrangement comprising a first bar and a second bar, the first bar being connected to the beam by a joint and the second bar including a roller in rolling engagement with the beam.

2. The apparatus of claim 1, wherein the each support element includes at least one support and guide roller.

3. The apparatus of claim 1, wherein each support unit of the plurality of support units includes two or more support elements.

4. The apparatus of claim 3, wherein the two or more support elements are linked by a crossbar.

5. The apparatus of claim 1, wherein the plurality of support units are arranged in one calibration station of the extrusion line.

6. The apparatus of claim 1, wherein each support element includes a first roller and a second roller, the rollers guiding a belt.

7. The apparatus of claim 2, wherein the at least one support and guide roller comprises two support and guide rollers, the two support and guide rollers being arranged on the beam in juxtaposition, in a row, or offset to one another.

8. The apparatus of claim 1, wherein each support element consists essentially of a support and guide roller.

9. The apparatus of claim 1, wherein each support element consists essentially of a first roller and a second roller, the rollers guiding a belt.

* * * * *